United States Patent
Amagai et al.

(10) Patent No.: US 6,267,295 B1
(45) Date of Patent: Jul. 31, 2001

(54) IC CARD PROCESSING APPARATUS HAVING A UNIQUE CONTACT MEMBER

(75) Inventors: Ryuuichi Amagai, Atsugi; Katsushi Nakamura, Ebina, both of (JP)

(73) Assignee: Anritsu Corporation, Tokyo (JP)

( * ) Notice: Subject to any disclaimer, the term of this patent is extended or adjusted under 35 U.S.C. 154(b) by 0 days.

(21) Appl. No.: 09/380,123

(22) PCT Filed: Jan. 8, 1999

(86) PCT No.: PCT/JP99/00035

§ 371 Date: Aug. 25, 1999

§ 102(e) Date: Aug. 25, 1999

(87) PCT Pub. No.: WO99/35609

PCT Pub. Date: Jul. 15, 1999

(30) Foreign Application Priority Data

Jan. 9, 1998 (JP) .................................................. 10-014998

(51) Int. Cl.[7] ...................................................... G06K 7/00
(52) U.S. Cl. ........................ 235/486; 235/475; 235/441; 235/492; 235/493
(58) Field of Search ..................................... 235/492, 486, 235/441, 483, 435, 439, 475, 477, 449, 493; 439/493, 495

(56) References Cited

U.S. PATENT DOCUMENTS

| 4,871,905 | * | 10/1989 | Mita et al. ............................ 235/475 |
| 5,508,501 | * | 4/1996 | Fujimoto ............................... 235/441 |
| 5,633,490 | * | 5/1997 | Vandenengel ........................ 235/492 |
| 5,726,432 | * | 3/1998 | Reichardt ............................. 235/441 |
| 5,729,000 | * | 3/1998 | Sugimoto ............................. 235/441 |
| 5,872,353 | * | 2/1999 | Reichardt et al. .................... 235/441 |
| 5,949,048 | * | 9/1999 | Nakamura et al. ................... 235/439 |

FOREIGN PATENT DOCUMENTS

| 0307692 A1 | * | 3/1989 | (EP) . |
| 2658338 | * | 8/1991 | (FR) . |
| 59-25698 | | 2/1984 | (JP) . |
| 2-12578 | | 1/1990 | (JP) . |
| 3-66708 | | 10/1991 | (JP) . |
| 7-92822 | | 10/1995 | (JP) . |

* cited by examiner

Primary Examiner—Michael G. Lee
Assistant Examiner—Uyen-Chan N. Le
(74) Attorney, Agent, or Firm—Frishauf, Holtz, Goodman, Langer & Chick, P.C.

(57) ABSTRACT

This invention provides an IC card processing apparatus in which a contact error does not occur in contact elements even when a warped card is inserted, and the service life of the contact of the contact elements can be prolonged. When an IC card 1, 1' is inserted to the deep end, the distal end of a second arm 42 of a pivot lever 40 abuts against the upper surface of a contact element block 50, to regulate the contact element block to swing about a fulcrum on a line almost perpendicularly intersecting one surface of the contact element block 50 and extending through almost the center of a contact element group, or a support axis perpendicularly intersecting this line, as the center. Therefore, the contact pressures between the respective contact elements 51 of the contact element block 50 and the respective contacts of the IC card 1, 1' become almost equal to each other. Even when a warped IC card 1' is inserted, a contact error or localization in contact wear do not occur, and the service life of the contacts can be prolonged.

6 Claims, 7 Drawing Sheets

IC CARD PROCESSING APPARATUS HAVING A UNIQUE CONTACT MEMBER

TECHNICAL FIELD

The present invention relates to an IC card processing apparatus and, more particularly, to a technique for performing stable signal processing in an IC card processing apparatus which receives an IC card having a plurality of contacts on its one surface to a predetermined position, brings contact elements into contact with the respective contacts of the received IC card, and exchanges signals with the IC card.

BACKGROUND ART

Conventionally, in an IC card processing apparatus for reading and writing information from and on an IC card, its contact elements are brought into contact with a plurality of contacts (generally 4×2 rows) formed on one surface of the IC card received to a predetermined position, and signal exchange with a circuit in the IC card is performed through electrical connection between the respective contacts and contact elements.

In this IC card processing apparatus, before the leading end of the IC card passes the positions of the contact elements, the IC card is entered with its one surface being separate from the contact elements so as not to make the leading end of the IC card being inserted push the contact elements to deform them. After the leading end of the IC card passes the positions of the contact elements, the contact elements are urged against the card, or inversely the card is urged against the contact elements, so that the contact elements come into contact with the respective contacts of the IC card.

Figure 11A:
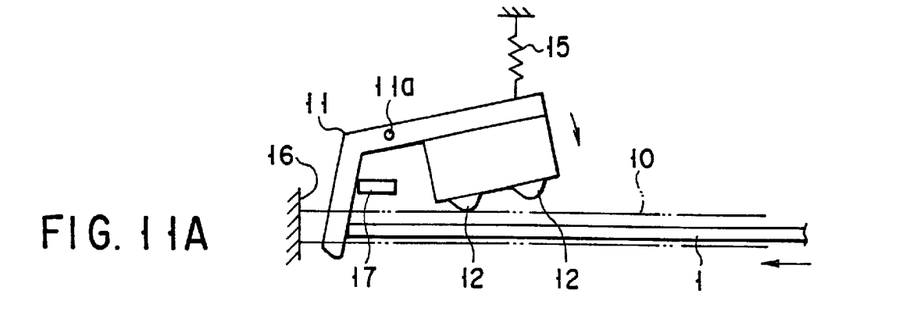
FIGS. 11A to 11C are schematic side views of a conventional apparatus.
Figure 11B:
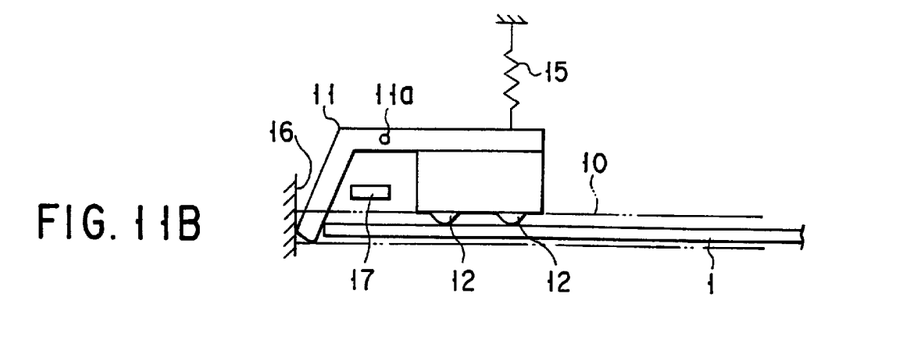

In order to realize this, conventionally, as shown in, e.g., FIGS. 11A and 11B, an L-shaped pivot lever 11 is arranged above the rear portion of a card guide path 10, and one end side of the pivot lever 11 is allowed to enter the card guide path 10. A plurality of contact elements 12 are formed on the lower surface of the other end side of the pivot lever 11.

More specifically, as shown in FIG. 11A, the pivot lever 11 is pushed at its one end side by the leading end of an IC card 1 which has entered by being guided along the card guide path 10, so that it is pivoted about a shaft 11a as the center.

As shown in FIG. 11B, the contact elements 12 and the contacts (not shown) of the IC card 1 are brought into contact with each other.

In FIGS. 11A and 11B, a spring 15 biases the pivot lever 11 in a direction to make the contact elements 12 move away from the card guide path 10, and stoppers 16 and 17 regulate rotation of the pivot lever 11.

Figure 11C:
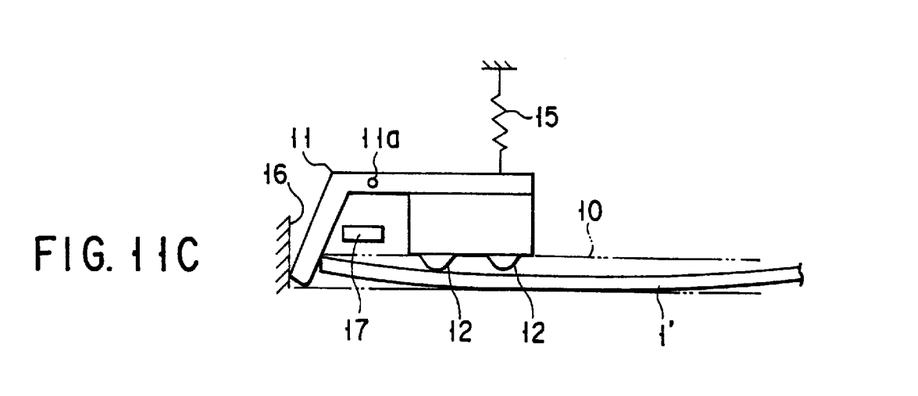

In the conventional IC card processing apparatus described above, when a warped and deformed IC card 1' is inserted, as shown in FIG. 11C, the contact pressure between the contact elements 12 and IC card 1' largely differs between the rear row and the front row, and causes a contact error or localizes wear of the contact elements. As a result, the service life of the contacts is shortened.

In particular, assume an IC card processing apparatus in which the card guide path is largely opened on the lower surface side to allow a defective card to drop naturally in order to prevent card clogging caused by a defective card shorter than a regular-length card. Since the IC card is guided only with its one end edge in the widthwise direction, the warped of the IC card cannot be sufficiently corrected, and the problem described above becomes more conspicuous.

Even if the IC card itself is not warped, when the IC card inserted to the deep end is further pushed strongly, the card is warped to cause a contact error.

SUMMARY OF THE INVENTION

It is an object of the present invention to provide an IC card processing apparatus by which the problems described above are solved, no contact error occurs even when the card is warped, and the service life of the contacts is long, and which can perform stable signal processing.

According to an aspect of the present invention, in order to achieve the above object, there is provided an IC card processing apparatus having a frame (21) formed with a slot for receiving an IC card, and a contact element block (50) formed in the frame and having a plurality of contact elements on one side surface thereof to respectively come into contact with a plurality of external terminals of the IC card received in the frame, characterized in that the contact element block is supported by the frame through a support member so as to be movable perpendicularly to a surface of the IC card received through the slot, translatable perpendicularly to the surface of the IC card along an axis extending through a center of the contact element block, and swingable about an axis located on the axis extending through the center of the contact element block and horizontal when seen from a receiving direction of the IC card, so that when the IC card is received through the slot, a surface of the IC card which is to be brought into contact through contacts and a surface of the contact element block where the contact elements are attached become almost parallel to each other.

DETAILED DESCRIPTION

The outline of the present invention will be described.

In order to achieve the above object, the first IC card processing apparatus according to the present invention has a contact element block having a plurality of contact elements formed on its one surface. The respective contact elements of the contact element block are brought into contact with respective contacts on one surface of an IC card received to a predetermined position, and signal exchange is performed between the IC card processing apparatus and the IC card. In this IC card processing apparatus, the contact element block is supported such that, when at least one surface of the IC card comes into contact with the contact elements, it can swing about a fulcrum on a line almost perpendicularly intersecting one surface of the contact element block and extending through almost the center of the contact element group, or a support axis perpendicularly intersecting this line, as the center.

The second IC card processing apparatus according to the present invention has a contact element block having a plurality of contact elements formed on its one surface. The respective contact elements of the contact element block are brought into contact with respective contacts on one surface of an IC card received to a predetermined position, and signal exchange is performed between the IC card processing apparatus and the IC card. This IC card processing apparatus has a support portion for supporting the contact element block to be swingable with respect to one surface of the IC card, and a movable member which moves upon reception of an insertion force of the IC card. When at least one surface of the IC card comes into contact with the contact elements, the movable member abuts against the opposite surface of the contact element block at a position on a line almost perpendicularly intersecting one surface of the contact element block and extending through almost the center of the contact element block, to regulate the contact element block to swing about this abutting position as the center.

According to the third IC card processing apparatus according to the present invention, in the second IC card processing apparatus described above, the support member supports the contact element block to be swingable with respect to and to be able to move close to and away from one surface of the IC card. The movable member moves the contact element block to come close to one surface of the IC card as the IC card approaches the predetermined position.

The fourth IC card processing apparatus according to the present invention has a contact element block having a plurality of contact elements formed on its one surface. The respective contact elements of the contact element block are brought into contact with respective contacts on one surface of an IC card received to a predetermined position, and signal exchange is performed between the IC card processing apparatus and the IC card. This IC card processing apparatus has a pivot member which, upon reception of the insertion force of the IC card with its one end side, pivots such that its other end side moves close to one surface of the IC card. The contact element block is supported on the other end side of the pivot member so as to be swingable about a fulcrum on a line almost perpendicularly intersecting one surface of the contact element block and extending through almost the center of the contact element group, or a support axis perpendicularly intersecting this line, as the center.

(One Embodiment)

One embodiment of the present invention will be described with reference to the accompanying drawings.

FIGS. 1 to 6C show the schematic structure of an IC card processing apparatus 20 according to one embodiment of the present invention.

Referring to FIGS. 1 to 6C, a frame 21 of the IC card processing apparatus 20 is formed of side plates 22 and 23 and a rear plate 24 into a substantially channel-like shape when seen from above. The side plates 22 and 23 are parallel to each other so that they oppose each other at a gap slightly wider than the width of the IC card. The rear plate 24 connects the rear ends of the side plates 22 and 23.

The interior of the frame 21 is vertically partitioned by a substantially rectangular base plate 25.

Projections 25a and 25b are formed on the two sides of the front portion of the base plate 25 to receive the IC card.

A lower plate 26 horizontally extends between the lower edges of the front portions of the side plates 22 and 23 to define a slot 100 serving as an IC card inlet/outlet port together with the front portion of the base plate 25.

Projections 26a and 26b are formed on the two sides of the front portion of the lower plate 26 to oppose the projections 25a and 25b, respectively, of the base plate 25.

Although not shown, a mechanism and sensor for detecting insertion of an IC card inserted through the slot 100 serving as the IC card inlet/outlet port, an IC card locking mechanism, and the like are provided between the projections 25a and 25b of the base plate 25 and the projections 26a and 26b.

The inner walls of the lower portions of the side plates 22 and 23 regulate widthwise movement of the IC card inserted horizontally from the front end side of the frame 21.

A rail plate 28 extending backward from the lower edge of the front portion of one side plate 22 to have a predetermined width supports one edge portion of the IC card from below.

A card receiving plate 29 extending from the lower edge of the rear plate 24 forward along the frame 21 guides, to a predetermined height, the leading end edge of the IC card guided and inserted to the deep end.

The rear end of the base plate 25 is formed with a rectangular hole 30 through which one end side of a pivot lever 40 (to be described later) is to extend.

A rectangular hole 31 through which a contact element block 50 (to be described later) moves vertically is formed in front of the hole 30.

Bearings 32 and 33 stand on the two sides of a portion between the holes 30 and 31 in the upper surface of the base plate 25.

Guide shafts 34 and 35 for forming the support member of this embodiment stand in front of the bearings 32 and 33 on the two sides of the hole 31.

A guide 36 is formed in front of the hole 31 in the lower surface of the base plate 25. The guide 36 causes the leading end of the IC card, which is being inserted, to pass at a position lower than the hole 31 by a predetermined distance.

A lever shaft 37 horizontally extends between the bearings 32 and 33 to be supported by them.

The pivot lever 40 for forming the support member and movable member of this embodiment is mounted on the lever shaft 37.

The pivot lever 40 is formed of a first arm 41 and a second arm 42 into a substantially inverted L shape. The first arm 41 extends through the hole 30 in the base plate 25 such that its distal end is close to the upper surface of the card receiving plate 29. The second arm 42 extends above the hole 31 of the base plate 25. The lever shaft 37 extends through a shaft hole 43 extending laterally to the rear portion of the second arm 42. The pivot lever 40 is supported to be pivotal about the lever shaft 37 as the center.

The pivot lever 40 is biased by a spring 44 attached to the lever shaft 37 in a direction to make the second arm 42 move away from the upper surface of the base plate 25.

When the IC card is not inserted, the first arm 41 is stopped at a position where it abuts against the front edge of the hole 30 of the base plate 25.

The distal end of the second arm 42 is branched into two parallel arm plates 42a and 42b, and the distal end portions of the arm plates 42a and 42b are connected to each other with a shaft 47c.

The contact element block 50 is mounted on the guide shafts 34 and 35 standing on the base plate 25.

The contact element block 50 is formed to have a substantially rectangular shape, and integrally supports a plurality of (4×2 rows) substantially V-shaped contact elements 51 projecting from its lower surface 50*a*.

Holes 52 and 53 are formed on the two sides of the center of the upper portion of the contact element block 50. The guide shafts 34 and 35 extend through the holes 52 and 53 with a backlash.

Due to the guide shafts 34 and 35 extending through the holes 52 and 53, the contact element block 50 can move vertically with respect to the base plate 25 and can be inclined with respect to the base plate 25 in an arbitrary direction within a predetermined angular range.

An inverted L-shaped projection 54, constituted by an upwardly extending vertical portion 54*a* and a horizontal portion 54*b* extending horizontally from the distal end of the vertical portion 54*a*, is formed at almost the center of an upper surface 50*b* of the contact element block 50.

A shaft 42*c* at the distal end of the second arm 42 of the pivot lever 40 is inserted between the horizontal portion 54*b* of the projection 54 and the upper surface 50*b* of the contact element block 50 with a slight backlash in the vertical direction.

When the IC card is not inserted, the contact element block 50 is supported and suspended because the lower surface of the horizontal portion 54*b* of its projection 54 abuts against the shaft 42*c* of the pivot lever 40.

When the IC card is inserted and the distal end side of the second arm 42 of the pivot lever 40 moves downward, the contact element block 50 also moves downward. After the contact elements 51 of the contact element block 50 come into contact with the IC card, the contact element block 50 moves further downward since its upper surface 50*b* is pressed by the lower portions of the distal ends of the arm plates 42*a* and 42*b*.

This IC card processing apparatus receives an IC card inserted through the card slot 100 that receives the IC card from the outer surface of an equipment housing to which the IC card processing apparatus is provided.

The operation of the IC card processing apparatus having the above arrangement will be described.

An IC card 1 inserted through the card slot 100 is guided to the deep end along the lower surface of the base plate 25.

Figure 1:
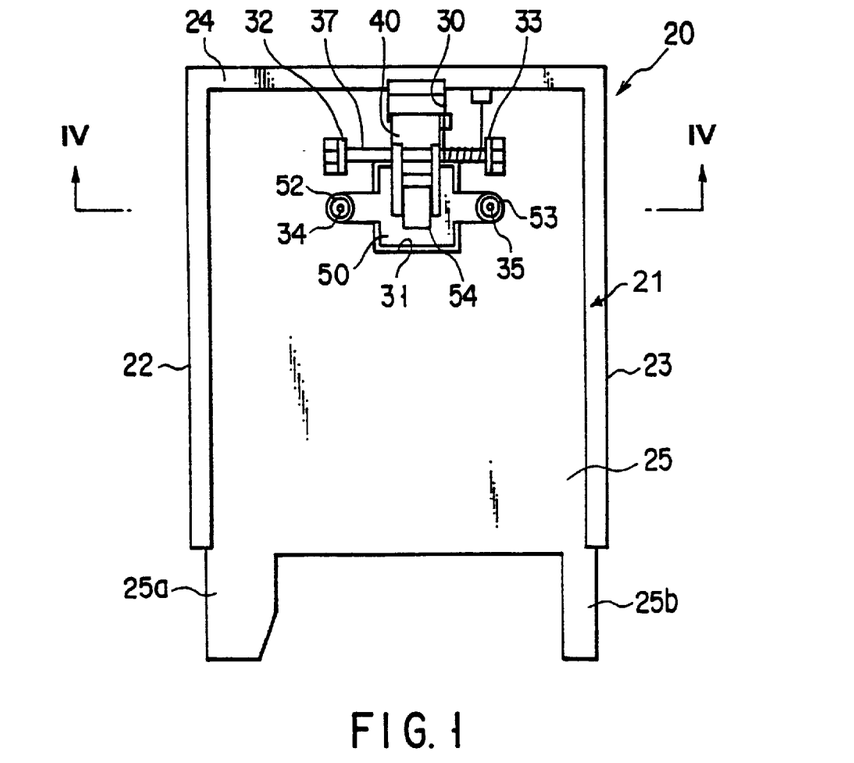
FIG. 1 is a plan view of an embodiment of the present invention.
Figure 2:
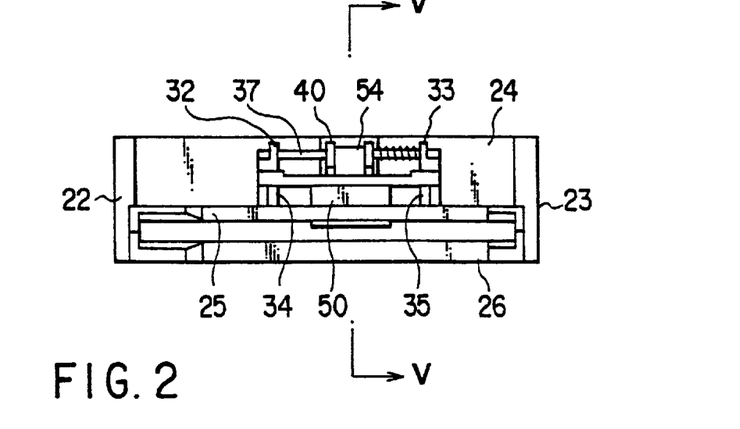
FIG. 2 is a front view of this embodiment.
Figure 3:
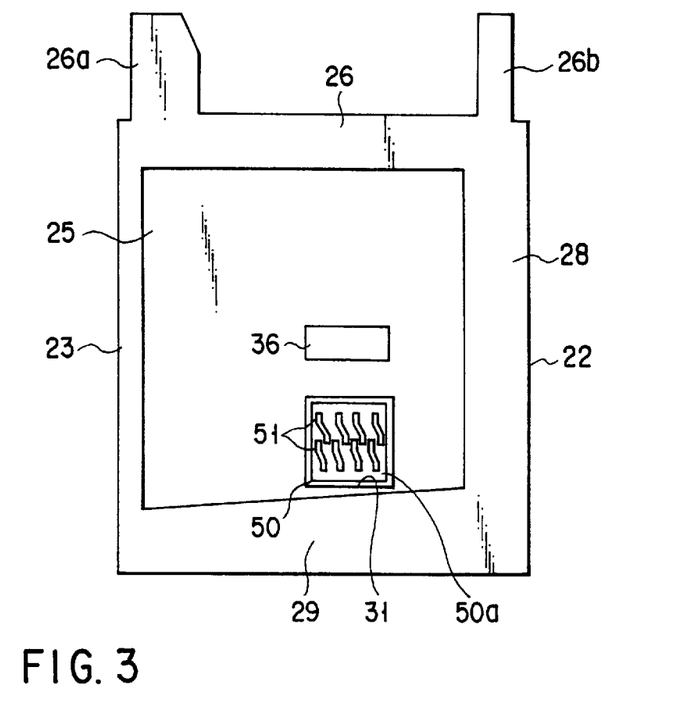
FIG. 3 is a bottom view of this embodiment.
Figure 4:
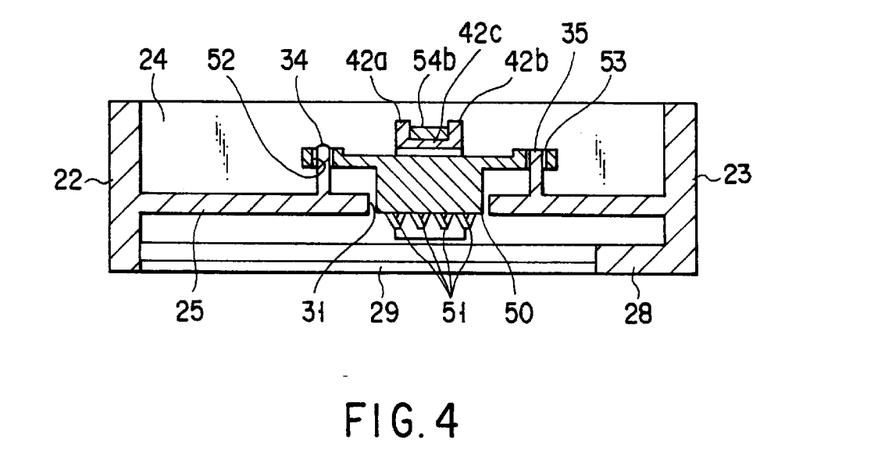
FIG. 4 is a sectional view taken along the line IV—IV of FIG. 1.
Figure 5:
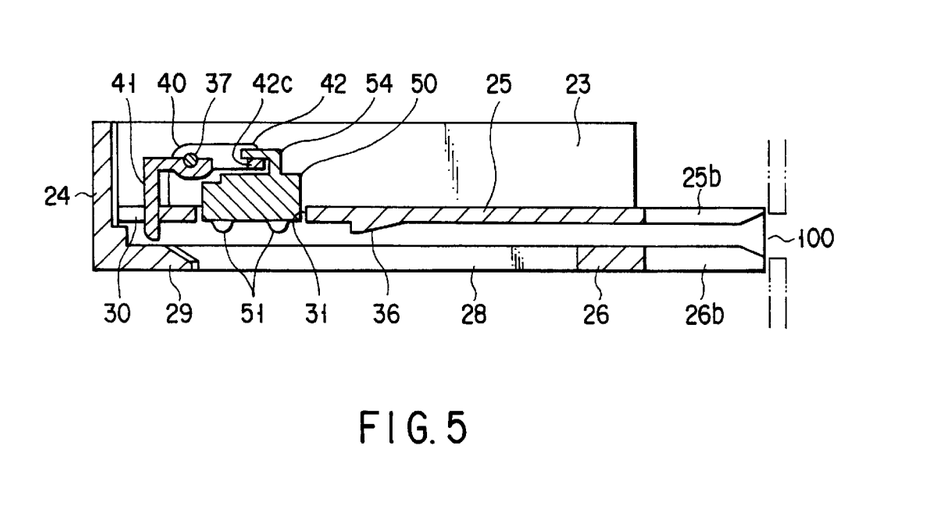
FIG. 5 is a sectional view taken along the line V—V of FIG. 2.
Figure 6A:
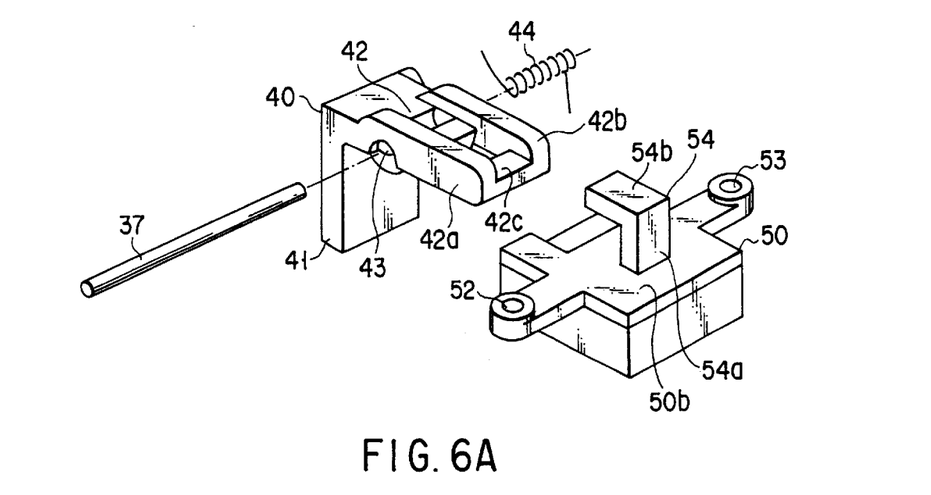
FIGS. 6A to 6C are enlarged perspective views of the main part of this embodiment.
Figure 6B:
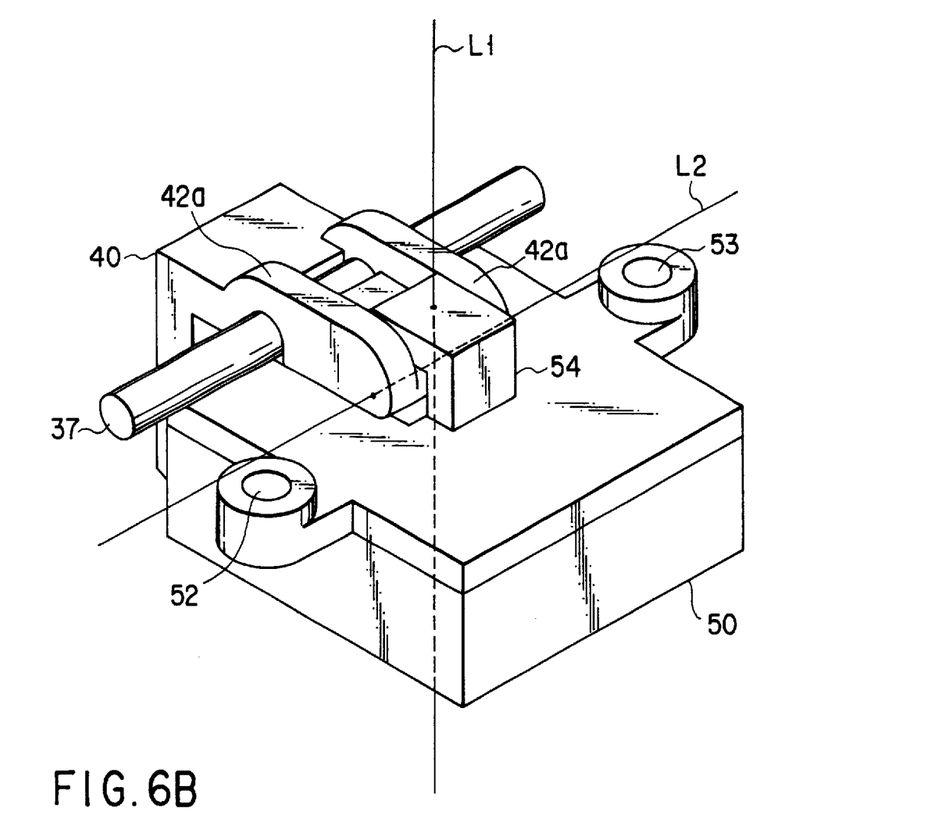
Figure 6C:
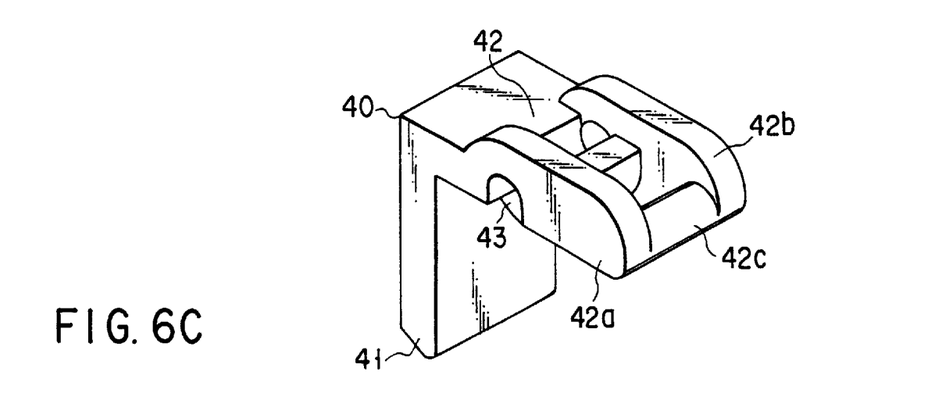
Figure 7A:
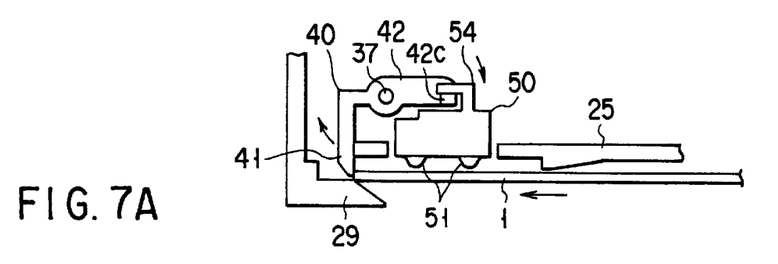
FIGS. 7A to 7D are schematic side views for explaining the operation of this embodiment.

The leading end of the IC card 1 passes below the contact element block 50, reaches a portion above the card receiving plate 29, and abuts against the first arm 41 of the pivot lever 40, as shown in FIG. 7A. When the IC card 1 further moves into the deep end, the pivot lever 40 pivots clockwise (in FIG. 7A) by the card insertion force, and the distal end of the second arm 42 moves downward.

Figure 7B:
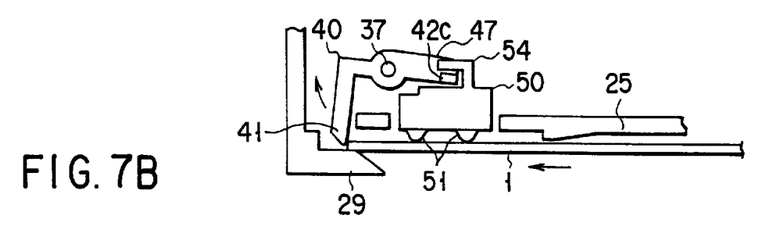

Accordingly, the contact element block 50 moves downward toward the upper surface of the IC card 1, and the lower ends of the respective contact elements 51 come into contact with the upper surface of the IC card 1, as shown in FIG. 7B.

The shaft 42*c* at the distal end of the pivot lever 40 moves away from the horizontal portion 54*b* of the projection 54 of the contact element block 50. Hence, the contact element block 50 is placed on the IC card 1.

When the IC card 1 is inserted deeply and the pivot lever 40 is further pivoted, the distal end of the second arm 42 abuts against the central portion of the upper surface of the contact element block 50, to press the contact element block 50 downward.

The contact element block 50 accordingly moves further close to the upper surface of the IC card, and the respective contact elements 51 come into contact with the upper surface of the IC card 1 while deforming elastically.

When the IC card 1 is inserted further deeply, the leading end of the IC card 1 passes the lower end of the first arm 41 of the pivot lever 40 to abut against the rear plate 24, as shown in FIG. 7B. The respective contact elements 51 come into contact with the respective contacts of the IC card 1 with an appropriate contact pressure. Return movement of the IC card is regulated by a locking mechanism (not shown).

The distal end of the second arm 42 of the pivot lever 40 is in contact with the center of the upper surface of the contact element block 50, i.e., a point on a line perpendicularly intersecting the lower surface of the contact element block 50 and extending through almost the center of the contact element group (or a line perpendicularly intersecting this line). The contact element block 50 is regulated to be swingable about this contact position Q as the center.

Figure 7C:
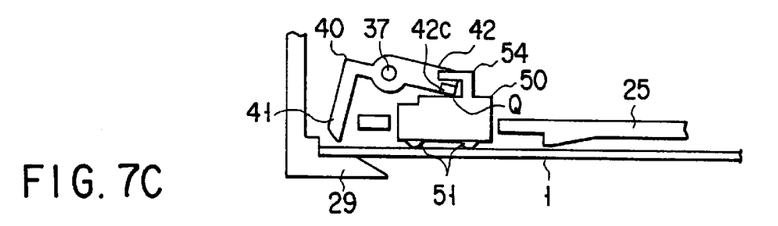

Therefore, as shown in FIG. 7C, when the IC card 1 free from a warped is inserted horizontally, the contact element block 50 becomes almost horizontal so that the force acting on the respective contact elements on the front row and the force acting on the respective contact elements on the rear row balance with each other.

Figure 7D:
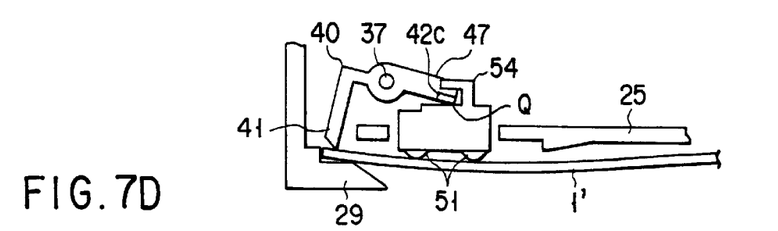

As shown in FIG. 7D, when a downwardly warped IC card 1' is inserted, the contact element block 50 is inclined so that the force acting on the respective contact elements on the front row and the force acting on the respective contact elements on the rear row balance with each other, and the contact pressures between the respective contact elements and the contacts of the IC card become almost equal to each other.

For this reason, the respective contact elements and the respective contacts of the IC card 1 come into reliable, stable contact with each other without causing a contact error, and the information read/write process for this IC card can be performed reliably and stably.

If the width of the distal end of the second arm 42 is greatly smaller than the width of the contact element block 50, the contact element block 50 can swing not only in the card insertion direction but also in the widthwise direction of the card.

Figure 8:
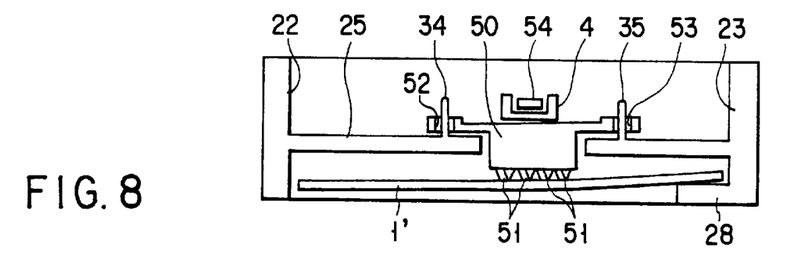
FIG. 8 is a schematic front view for explaining the operation of this embodiment.

Even if the inserted IC card 1' is inclined in the widthwise direction or is warped, the direction of the contact element block 50 changes in accordance with this inclination or warped, and a stable contact state can be maintained, as shown in FIG. 8.

When information read/write operation for the IC card is ended and the return regulation for the card is canceled, the IC card 1 returns toward the card slot. In accordance with this return movement of the IC card, the pivot lever 40 pivots counterclockwise, and the contact element block 50 moves upward to be restored to a state before card insertion.

While the IC card is being inserted or returned, the contact elements 51 and the contacts of the IC card come into slidable contact with each other. As described above, the contact element block 50 swings such that the contact pressures between the respective contact elements and contacts become equal to each other. Therefore, the contacts are free from localization in wear, and the service life of the contacts is prolonged.

(Another Embodiment)

In the embodiment described above, the contact element block 50 is moved upward/downward by the pivot lever 40. Alternatively, as shown in FIGS. 9A and 9B, a contact element block 50' may be moved upward/downward by a slide member 60 which slides as it is pushed by the leading end of the IC card.

In this case, the contact element block 50' is moved downward by abutting one end 60*a* of the slide member 60 against a tilted portion 56 formed in the upper surface of the contact element block 50'. When the IC card reaches almost a predetermined position, the contact element block 50' is abutted against one end 60a of the slide member 60 on a line extending through the center of the contact element group of the contact element block 50'. The contact block 50' is regulated to swing about this contact portion as the swing center. Then, the direction of the contact element block 50' changes such that the force acting on the respective contact elements on the front row and the force acting on the respective contact elements on the rear row balance with each other, in the same manner as in the above embodiment, and the contact pressures between the respective contact elements and the contacts of the IC card become almost equal to each other.

Figure 9A:
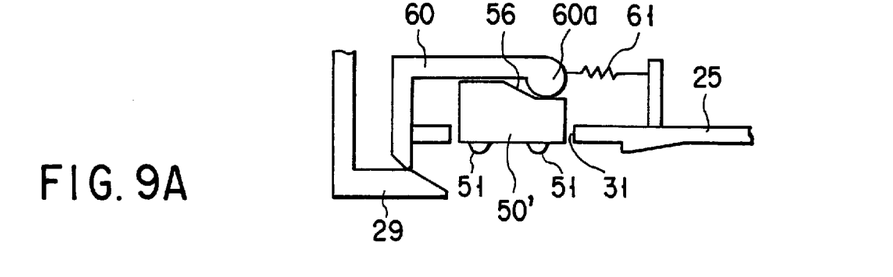
FIGS. 9A and 9B are schematic side views of another embodiment.
Figure 9B:
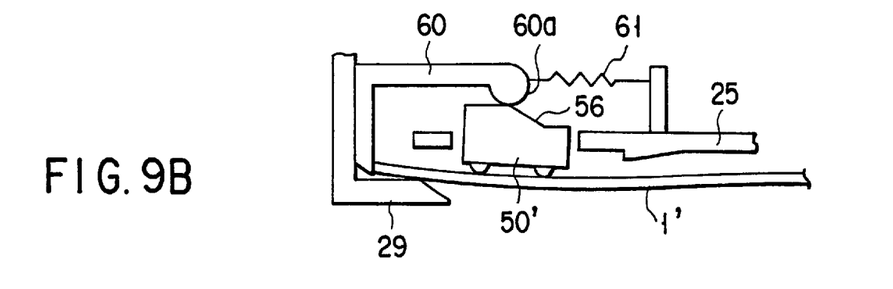

Referring to FIGS. 9A and 9B, reference numeral 61 denotes a spring for biasing the slide member 60 forward.

The contact element block 50' is swingably supported by guide shafts 34 and 35, in the same manner as in the above embodiment, and is biased by a spring (not shown) or the like in a direction to abut against one end side of the slide member 60.

In this case, the slide member 60 does not support the contact element block 50'. The contact element block 50' is supported by only the guide shafts 34 and 35.

Figure 10A:
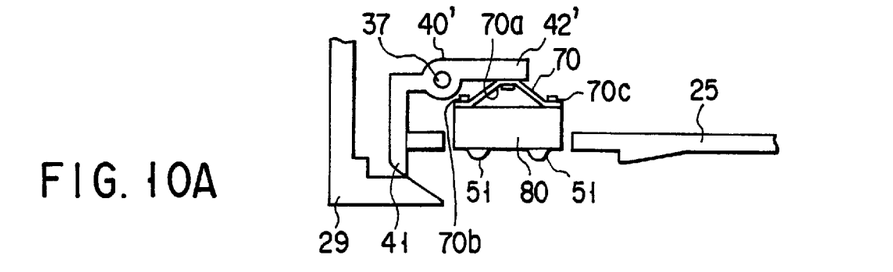
FIGS. 10A and 10B are schematic side views of still another embodiment.
Figure 10B:
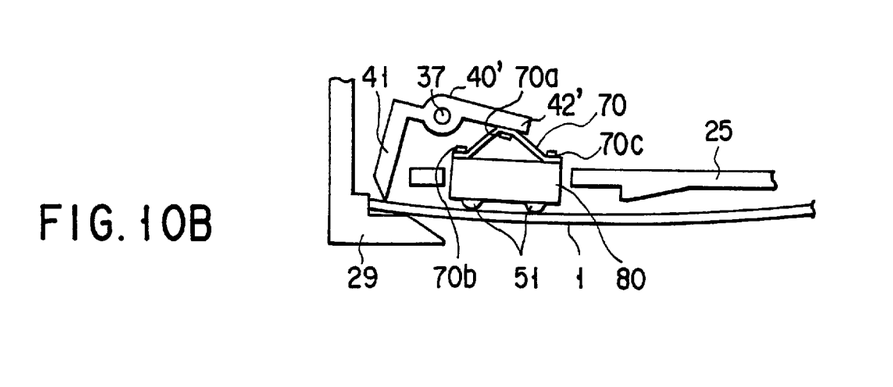

In the above embodiment, the contact element bock 45 is swingably supported by the two guide shafts 34 and 35 and the distal end portion of the second arm 42 of the pivotal arm 40. Alternatively, as shown in FIGS. 10A and 10B, a central portion 70a of an inverted V-shaped support plate spring 70 may be fixed to the lower surface of the distal end of a second arm 42' of a pivotal arm 40'. Distal end portions 70b and 70c of the support plate spring 70 may be slidably attached to the two edges of the upper surface of a contact element block 80. The contact element block 80 may be supported to have a swing center on a line extending through the center of the group of contact elements 51.

In this case, when the IC card is inserted, the direction of the contact element block 80 changes due to the elastic deformation of the support plate spring 70 in the opening direction and in the direction of torsion in accordance with the warped of the IC card, and the respective contact elements 51 and the respective contacts of the IC card come into contact with each other with almost equal contact pressures.

In the above embodiment, the contact element block is supported such that it can always swing regardless of the presence/absence of the IC card. Alternatively, the contact element block may not swing while the IC card is not inserted or while the received IC card is located distant from the predetermined position.

In the above embodiment, the contact element block is urged against one surface of the IC card by the pivot lever. Alternatively, the IC card may be moved close to the contact element block.

For example, a lever which pivots upon direct reception of a card insertion force, or a lever which pivots interlocked with the movement of the slide member (described above), may be provided under the card guide path. The IC card may be pushed upward from the lower surface side by the card insertion force.

Alternatively, such a movable member may not be used, but the guide path may be formed to guide the leading end side of the IC card toward the base plate (for example, in the above embodiment, the card receiving plate 29 may be formed such that its rear portion is inclined upward). Then, the deeper the IC card is inserted, the closer its one surface becomes to one surface of the contact element block.

In any case, assume that the contact element block is supported to be swingable, when at least the IC card comes into contact with the contact elements of the contact element block, about a fulcrum on a line extending through almost the center of the contact element group, or a support axis perpendicularly intersecting this line, as the center. Then, the respective contact elements and the respective contacts of the IC card can brought into contact with each other with almost equal contact pressures, in the same manner as in the above embodiment.

As has been described above, in the IC card processing apparatus according to the present invention, the contact element block having the plurality of contact elements on its one surface is supported by the frame such that, when at least the contact elements come into contact with one surface of the IC card, the contact element block can translate along an axis (L1 in FIG. 6B) almost perpendicularly intersecting one surface of the contact element block and extending through almost the center of the contact element group, and can swing about an axis (L2 in FIG. 6B) located on the axis L1 and horizontal when seen in the receiving direction of the IC card.

Therefore, the contact pressures between the respective contact elements of the contact element block and the respective contacts of the IC card become almost equal to each other. Even when a warped IC card is inserted, a contact error, localization in contact wear, and the like do not occur, and the service life of the contacts can be prolonged.

As described above in detail, according to the present invention, an IC card processing apparatus can be provided in which conventional problems are solved and a contact error does not occur even if the card is warped, and which has a long service life and can perform stable signal processing.

What is claimed is:

1. An IC card processing apparatus having a frame formed with a slot for receiving an IC card, and a contact element block formed in said frame and having a plurality of contact elements on one side surface thereof to respectively come into contact with a plurality of external terminals of the IC card received in said frame, wherein said contact element block is supported by said frame through a support member so as to be movable perpendicularly to a surface of the IC card received through said slot, translatable perpendicularly to the surface of the IC card along an axis extending through a center of said contact element block, and swingable about an axis located on the axis extending through the center of said contact element block and horizontal when seen from a receiving direction of the IC card, so that when the IC card is received through said slot, a surface of the IC card which is to be brought into contact through contacts and a surface of said contact element block where said contact elements are attached become substantially parallel to each other, and said support member comprises a support portion for supporting said contact element block to be swingable with respect to one surface of the IC card, and a movable member, which moves upon reception of an insertion force of the IC card and which comes into contact with an opposite surface of said contact element block at a position on a line substantially perpendicularly intersecting one surface of said contact element block and extending through substantially a center of said contact element block, when at least one surface of the IC card comes into contact with said contact elements, to regulate said contact element block to swing about the abutting position as a center.

2. An IC card processing apparatus according to claim 1, wherein said contact element block is supported so as to be swingable, when at least one surface of the IC card comes into contact with said contact elements, about a fulcrum on a line substantially perpendicularly intersecting said one surface of said contact element block and extending through substantially a center of said contact element group, or a support axis perpendicularly intersecting the line, as a center.

3. An IC card processing apparatus according to claim 1, wherein said support member supports said contact element block to be swingable with respect to and be able to move close to and away from one surface of the IC card, and said movable member moves said contact element block to come close to one surface of the IC card as the IC card approaches the predetermined position.

4. An IC card processing apparatus according to claim 1, wherein:

said apparatus has a pivot member which, upon reception of an insertion force of the IC card with one end side thereof, pivots such that the other end side thereof moves close to one surface of the IC card, and said contact element block is supported on the other end side of said pivot member so as to be swingable about a fulcrum on a line substantially perpendicularly intersecting one surface of said contact element block and extending through substantially a center of said contact element group, or a support axis perpendicularly intersecting the line, as a center.

5. An IC card processing apparatus according to claim 1, wherein said contact element block is moved upward/downward by said pivot member.

6. An IC card processing apparatus according to claim 1, wherein said contact element block is moved upward/downward by a slide member which slides upon being pushed by a leading end of the IC card.

* * * * *